United States Patent [19]

Sauve

[11] Patent Number: 4,648,198

[45] Date of Patent: Mar. 10, 1987

[54] FISHING LURE WITH RESILIENT STEM

[76] Inventor: Laurier Sauve, R.R. #1, Markstay, Ontario, P0M 2G0, Canada

[21] Appl. No.: 862,957

[22] Filed: May 14, 1986

[51] Int. Cl.[4] .............................................. A01K 85/00
[52] U.S. Cl. .................................... 43/42.06; 43/42.72
[58] Field of Search ................ 43/42.02, 42.06, 42.08, 43/42.22, 42.23, 42.49, 42.72

[56] References Cited

U.S. PATENT DOCUMENTS

| 923,670 | 6/1909 | Lockhart . |
| 1,078,886 | 11/1913 | Welles . |
| 1,812,235 | 6/1931 | Carr . |
| 2,207,425 | 7/1940 | Arbogast . |
| 2,270,487 | 1/1942 | Withey . |
| 2,538,459 | 1/1951 | Kasmeyer . |
| 2,549,077 | 4/1951 | Garth . |
| 2,552,730 | 5/1951 | Miller . |
| 2,561,040 | 7/1951 | Arbogast . |
| 2,663,963 | 12/1953 | Russell ............................ 43/42.72 X |
| 3,041,772 | 7/1962 | Laszlo . |
| 3,071,884 | 1/1963 | Peltz . |
| 3,628,276 | 12/1971 | Coalson ........................... 43/42.23 X |
| 4,438,583 | 3/1984 | Sullivan . |

FOREIGN PATENT DOCUMENTS 483534  5/1952  Canada ............................... 43/42.23

*Primary Examiner*—Nicholas P. Godici
*Assistant Examiner*—Carmine Cuda
*Attorney, Agent, or Firm*—Rogers & Scott

[57] ABSTRACT

The invention relates to a fishing lure having an elongated body with an internal throughpassage having a forward opening and a narrowed rearward opening. The lure body has a stem which is itself rigidly attached to the body at a position ahead of and below the center of mass of the body. A flexible portion of the stem extends upwardly and forwardly beyond the center of mass, and is adapted for attachment to a fishing line adjacent its free end. Tensioning of the fishing line causes the flexible portion to resiliently deform forwardly and downwardly so as to enhance the diving performance of the lure.

9 Claims, 7 Drawing Figures

FISHING LURE WITH RESILIENT STEM

This invention relates to fishing lures in general and more specifically to a lure that has enhanced diving characteristics.

To catch fish it is common to use an attractive object in conjunction with a sharp barbed hook on the end of a fishing line. These objects, commonly called lures, are available in many variations resembling flies, worms, and small fish. This invention relates to lures that resemble fish.

To enhance the attractiveness of lures, characteristics such as size, shape, colour, sound, smell and movement are incorporated into them. These characteristics mimic those of smaller fish that are typically preyed on by larger fish.

A characteristic, thought to be important for a lure to attract fish, is sound. It is commonly accepted that fish are affected by sounds or vibrations in the water and are generally attracted toward the source thereof. Some lures mimic fish by making splashing and gurgling sounds at the surface of the water, whereas others produce rattling and vibrating sounds that seem to attract small fish.

Another characteristic thought to be important in lures, is the simulation of the actions of small fish. A buoyant lure can be made to dive and resurface by reeling in the fishing line at varying speeds. Darting and side-to-side motions and random haphazard writhing motions also add to the realism of the movement of the lure. The lure described herein is believed to be better at mimicking these motions than prior art lures.

U.S. Pat. Nos. 923,670 and 1,812,235 teach that a lure can be induced to move erratically through the water if it has a longitudinal passageway constricted near the back. This feature has been successfully incorporated into lures for many years.

A pertinent prior art patent is U.S. Pat. No. 1,078,886 which discloses a lure adapted for attachment to a fishing line at its top front and which has a slanted bottom wall which deflects the lure downward, causing the lure to dive whenever the line tension is varied such as when the lure is reeled in. The inventive lure described herein allows for better control of diving through variation of the line tension.

Also of interest is U.S. Pat. No. 3,041,772 which discloses a rigid connector adapted for connection to a fishing line. The connector is pivotally attached to the inside bottom part of the lure and this form of connection is believed to cause the lure to have inferior diving characteristics.

In order that the invention may be readily understood, two embodiments thereof will now be described by way of example, with reference to the accompanying drawings in which:

FIG. 8 is a perspective view of a second fishing lure according to the invention which features a segmented body.

The invention relates to a construction for a novel fishing lure and more particularly for a fishing lure having improved diving characteristics.

Figure 1:
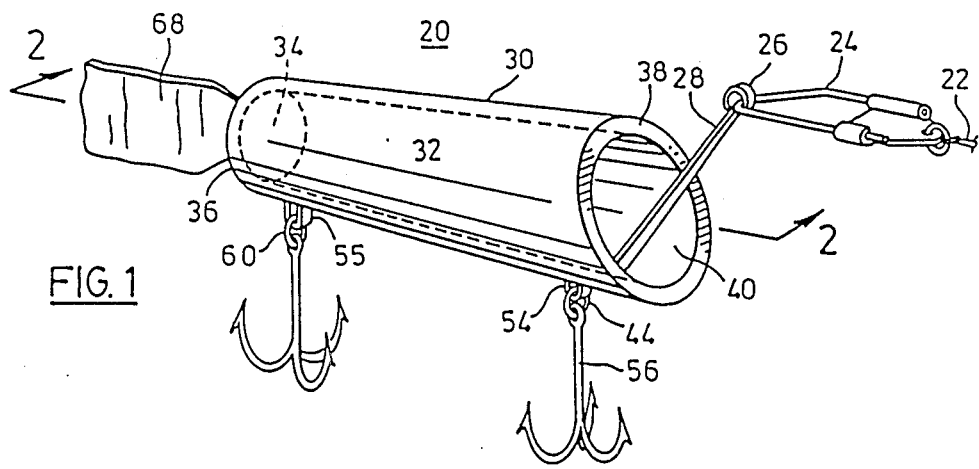
FIG. 1 is a perspective view of a fishing lure according to the invention adapted for attachment to a fishing line.
Figure 2:
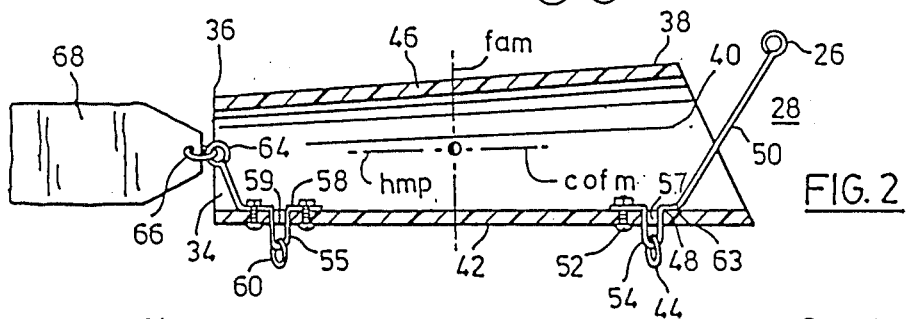
FIG. 2 is a sectional view along line 2—2 of FIG. 1, with the fishing line not shown.
Figure 3:
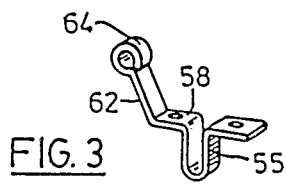
FIG. 3 is a perspective view of the hook attachment means shown in FIG. 2, which means incorporates a tail attachment means.
Figure 4:
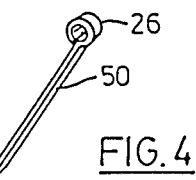
FIG. 4 is a perspective view of the stem means of FIG. 2, which stem means also incorporates a hook attachment means.
Figure 5:
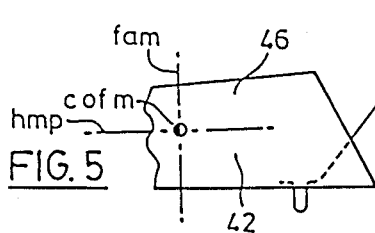
FIG. 5 is a schematic view of the forward end of the lure of FIGS. 1 and 2 showing the fishing line in an untensioned configuration and FIG. 6 is a view similar to FIG. 5, showing the fishing line under significant tension.

FIG. 1 shows a fishing lure, generally designated by the reference numeral 20, adapted for releasable attachment by a stem member 28 to a fishing line 22 through the agency of a well-known type of snap-pin assembly 24. The lure 20 is comprised of an elongated body 30 having an internal throughpassage 32 which narrows to an aft opening 34 positioned adjacent the rearward end 36 of the body 30. The body 30 may be constructed of wood, plastic or other suitable materials.

The throughpassage 32 terminates adjacent an opposite forward end 38 of the body 30 in a fore opening 40. In this description and the claims appended hereto, the term "forward end" means that end of the lure body 30 which meets the resistance of the water in which the lure is used as it is pulled through the water by the fishing line 22. Accordingly, the forward end 38 of the illustrated lure 20 is shown to the right of FIGS. 1–2, 5 and 6. Conversely, the "rearward end" of the body 30 is shown to the left of FIGS. 1–2, 5 and 6.

The throughpassage 32 is narrowed by having the top portion 46 of the body 30 downwardly-slanted toward the rearward end of the body 30, but other designs having a narrow throughpassage 32 are known in the art and are contemplated by the invention. As previously stated, the narrowing of the throughpassage 32 toward the rearward end 36 of the body 30 enhances the erratic movement of the lure 30 as it is pulled through the water.

The stem member 28 has a proximal portion 48 attached to the body 30 and an upwardly directed, forwardly cantilevered distal portion 50 adapted for attachment to the fishing line 22. The distal portion 50 of the stem member 28 must be constructed of spring metal, flexible plastic, or other similar materials so that it is resiliently deformable as outlined more fully below. The proximal portion 48 may be constructed of similar material, or of less flexible materials, so long as there is a rigid (i.e. non-swivelling) interface between the two portions, about which interface the distal portion 50 can be operatively deformed so as to be able to transmit a force couple from the distal portion 50 to the proximal portion 48. Accordingly, such an interface marks the boundary between the distal portion 50 and the proximal portion 48.

Where the stem member 28 is uniformly constructed of resiliently deformable material, the interface 63 is provided by rigid mounting of the proximal portion 48 to the body 30, such that operative deformation of the proximal portion 48 is possible only at the interface 63. The positioning of the interface 63 with respect to the horizontal mid-plane (abbreviated hmp in the Figures) and the fore/aft mid-plane (abbreviated fam in the Figures) of the body 31 is critical to the proper performance of the invention. That is, the proximal portion 48 must be attached to the body 30 in such a manner that the interface 63 (being the effective point of introduction to the body 30 of force couples from tensioning of the fishing line 22), is positioned at or below the horizontal mid-plane of the body 30 and forward of the vertical fore/aft mid-plane of the body 30, if improvements in diving performance according to the invention are to be obtained.

The horizontal mid-plane of the body is that horizontal plane which passes through the centre of mass (shown in the Figures by the legend "c of m") of the lure body 30 when such body 30 assumes its normal buoyant attitude while floating in still water, without the influence of tension from the fishing line 22. The fore/aft mid-plane of the body 30 is that vertical plane which passes through the centre of mass of the lure body 30 when such body 30 assumes its normal buoyant attitude in still water without influence of tension from the fishing line 22. The proximal portion 48 may be attached to the body 30 at any location thereon, so long as the interface 63 is at or below the horizontal mid-plane and forward of the fore/aft mid-plane of the body 30.

The distal portion 50 is adapted for attachment to the fishing line 20 by means of, for example, a looped end 26. Such point of attachment must, in the untensioned configuration shown in FIG. 5 and in the dotted outline shown in FIG. 6, be above the horizontal mid-plane of the body 30 and ahead of the interface 63, so that it is able to move forward and downward under tensioning by the fishing line so as to create a counter-rotational force couple about the centre of mass of the body 30, thus causing the forward end of the body to dip downwardly. Such attachment may be directly to the line 22, or, as shown, through a snap-pin assembly 24, which assembly allows for quick release of the line 22 from the lure 20.

A cantilevered clip member 62 projects upwardly and rearwardly from the second hook attachment means 58 to form a loop 64 at its free end, which loop is positioned in the aft opening 34. A tail member 68 is interconnected with the loop 64 through an eyelet 66 which passes through both the tail member 68 and the loop 64. In this manner, the tail member 68 is swivelly mounted on the body 30 so as to project rearwardly from the aft opening 34 of the body 30. This swivel mounting arrangement allows for free movement of the tail member 68 which in turn causes side-to-side movement of the lure body 30 upon retrieval. This motion generates a flapping or swirling sound, which sound attracts the attention of nearby fish.

Figure 7:
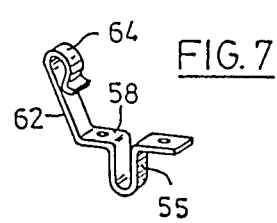
FIG. 7 is a view similar to FIG. 3 showing a modified form of tail attachment means.

The loop 64 may be modified as shown in FIG. 7 so as to allow for quick changing of the tail member 68 thereby allowing for the use of a wide range of tail members, including feathered skirts and spinners.

Figure 6:
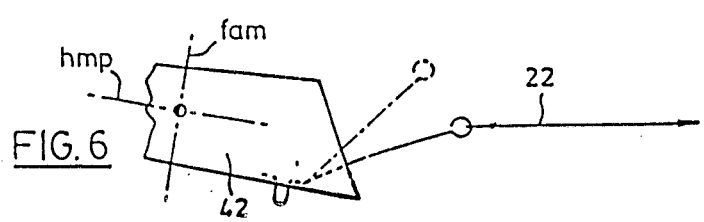

As previously discussed, the distal portion 50 must be contructed of a resiliently deformable material so that it will move generally forwardly and downwardly (as shown by the arrow of FIG. 6) in response to tensioning of the fishing line and to the inertial responses of the lure body 30 to acceleration caused by this tensioning. Such tensioning arises when, for example, the line is reeled in by the fisherman. The reeling motion is not normally of uniform velocity, and the inertia of the lure body 30 to acceleration changes causes the resiliently deformable distal portion 50 to oscillate back and forth in response to such changes. Such oscillations can cause sonic vibrations, thought to be attractive to the fish. More importantly, however, these oscillations cause the force couple about the centre of mass of the lure body to vary, thereby varying the rotational position of the lure body 30 in the water. Clockwise rotation (under positive acceleration) causes a deeper diving inclination, which is accentuated by the forward projection of the bottom portion 42 of the body. Anti-clockwise rotation under conditions of de-acceleration, causes upward climbing of the lure body in the water. The diving action may be controlled by varying the length of the distal portion 50 of the stem member 28. That is, lengthening of the distal portion 50 of the stem member 28 will result in a more pronounced diving effect, as a larger force couple is generated by a specified amount of movement by the lever action of the distal portion 50.

In operation, the normal reeling in of a lure 20 constructed according to the invention will cause erratic upward and downward movement of the body 30. In combination with the side-to-side movements of the body caused by the swivelly mounted tail member 68 and the shaping of the throughpassage 32, a lure 20 constructed according to the present invention exhibits a range of movements superior to prior art lures which movements have been successfully used to attract and capture larger numbers of fish than previously available lures.

It will be understood that the invention is not to be limited to the exact construction shown and described, but that various changes and modifications may be made without departing from the spirit and scope of the invention as defined in the appended claims. For example, the second hook attachment means 58 may be integrally formed as an extension of the proximal portion 48, so that a single assembly incorporating the proximal portion 50, the distal portion 48 and the second hook attachment means 58 is provided. This assembly is simply slid into the throughpassage 32 of the body 30, wherein it is fastened into position on the body as previously described. This arrangement makes for a simpler assembly that is easier and cheaper to manufacture. Of course, the number and construction of the hook members attached to the various hook attachment means can be varied without departing from the spirit of the invention, as can the type of tail member 68 attached to the lure body 30.

Additionally, the lure body may be of a jointed or segmented construction. FIG. 8 shows a bi-segmented lure having for 30a and aft 30b body segments joined by connecting upper and lower connecting bars 70, 70, which are pivotally attached to the respective segments by pivot pins 72. In this manner, the aft segment 30b is free to pivot in a generally horizontal plane as indicated by the arrow 74. In other basic respects, the construction of the lure is analogous to the embodiments of FIG. 1, as is self-evident from FIG. 8.

I claim:

1. A fishing lure for attachment to a fishing line comprising:
    an elongated body having an internal throughpassage which narrows to an aft opening adjacent the rearward end of the body, and which terminates adjacent the opposite forward end of the body in a fore opening;
    one or more hook attachment means fastened securely to the body;
    one or more hook members connected to the hook attachment means;
    a one piece stem member having proximal and distal portions, the proximal portion being secured to the body and having a rigid interface between the proximal and distal portions, said interface being below the horizontal mid-plane of the body and forward of the vertical fore/aft mid-plane of the body;

the distal portion having means for attachment to the fishing line at a position above the horizontal mid-plane of the body and being resiliently deformable such that said distal portion moves generally forwardly and downwardly towards the horizontal mid-plane of the body in response to tensioning of the fishing line.

2. A fishing lure according to claim 1 wherein the fore opening is downwardly slanted such that the bottom portion of the body projects further forward than does the top portion thereof.

3. A fishing lure according to claim 2 wherein a tail member is swivelly mounted on the body by means of a looped clip, which clip interconnects with an eyelet mounted through the tail member, such that said tail member projects rearwardly from the body.

4. A fishing lure according to claim 3 wherein the stem means is constructed of spring metal.

5. A fishing lure according to claim 4 wherein the proximal portion is positioned within the throughpassage and is fastened securely to the bottom portion of the body adjacent the fore opening, such that the distal portion protrudes forwardly through said opening.

6. A fishing lure according to claim 5 wherein the proximal portion is adapted to form one of said hook attachment means.

7. A fishing lure according to claim 6 wherein the looped clip is adapted to form a second one of said hook attachment means and one or more hook members are connected to each one of said hook attachment means.

8. A fishing lure for use in water with a fishing line, said lure comprising:

an elongated body having an internal throughpassage which narrows to an aft opening adjacent one end of the body, and which terminates adjacent the opposite other end of the body in a downwardly-slanted fore opening to the throughpassage;

one or more hook members carried by the body;

a forwardly cantilevered resiliently deformable one-piece stem means having opposed proximal and distal portions;

the proximal portion being rigidly attached to the lure body within the throughpassage at a point below the horizontal mid-line of the body and forward of the vertical mid-line of the body;

the distal portion, in its undeformed rest position, being positioned above the horizontal mid-line of the body fore of the proximal portion and having means for connection to the fishing line;

the stem means being resiliently deformable from said rest position such that the distal portion moves downwardly to at least the horizontal mid-line of the body in response to tensioning of the fishing line.

9. A fishing lure according to claim 8 wherein the elongated body is comprised of two or more articulated segments.

* * * * *